US009055040B2

(12) United States Patent
Wang et al.

(10) Patent No.: US 9,055,040 B2
(45) Date of Patent: Jun. 9, 2015

(54) METHOD AND APPARATUS FOR CONTENT PROTECTION IN WIRELESS COMMUNICATIONS

(75) Inventors: Jun Wang, La Jolla, CA (US); Charles N. Lo, San Diego, CA (US); Lakshminath Reddy Dondeti, San Diego, CA (US); Philip Michael Hawkes, Warrimoo (AU)

(73) Assignee: QUALCOMM Incorporated, San Diego, CA (US)

( * ) Notice: Subject to any disclaimer, the term of this patent is extended or adjusted under 35 U.S.C. 154(b) by 1220 days.

(21) Appl. No.: 11/669,873

(22) Filed: Jan. 31, 2007

(65) Prior Publication Data

US 2007/0274526 A1    Nov. 29, 2007

Related U.S. Application Data

(60) Provisional application No. 60/764,897, filed on Feb. 3, 2006, provisional application No. 60/778,742, filed on Mar. 3, 2006, provisional application No. 60/802,556, filed on May 19, 2006.

(51) Int. Cl.
G06F 21/10    (2013.01)
H04L 29/06    (2006.01)

(52) U.S. Cl.
CPC ............... *H04L 63/06* (2013.01); *G06F 21/10* (2013.01); *G06F 2221/0797* (2013.01); *H04L 2463/101* (2013.01)

(58) Field of Classification Search
CPC ............................... H04L 63/06; G06F 21/10
USPC ......................................................... 726/27
See application file for complete search history.

(56) References Cited

U.S. PATENT DOCUMENTS 7,623,871 B2    11/2009  Sheynblat
2002/0067730 A1*  6/2002  Hinderks et al. ......... 370/395.52

(Continued)

FOREIGN PATENT DOCUMENTS

EP      1 513 040 A1    9/2005
WO     WO-03092319      11/2003

(Continued)

OTHER PUBLICATIONS

International Preliminary Report on Patentability—PCT/US07/061577—The International Bureau of WIPO, Geneva, Switzerland—Aug. 5, 2008.
Written Opinion—PCT/US07/061577—International Search Authority, European Patent Office—Jul. 26, 2007.
International Search Report—PCT/US07/061577—International Search Authority, European Patent Office—Jul. 26, 2007.

(Continued)

*Primary Examiner* — William Powers
(74) *Attorney, Agent, or Firm* — Kevin T. Cheatham

(57) ABSTRACT

Disclosed is a method for securely presenting content in a mobile station. The mobile station may have a smart module, a security agent, and an air interface for communicating with a content provider and with a remote content rights manager. The smart module stores content presentation units and has a proxy content rights manager for when the mobile station is unable to receive secure content keys from the remote content rights manager using the air interface. In the method, content presentation units are transferred from the remote rights manager to the smart module for storage. Secure content keys are requested from the smart module for allowing presentation of content requested while the mobile station is unable to communicate with the remote rights manager. The secure content keys are transferred, based on a stored content presentation unit, from the proxy content rights manager to the security agent for allowing content presentation.

31 Claims, 4 Drawing Sheets

(56) References Cited

U.S. PATENT DOCUMENTS

2004/0158712 A1* 8/2004 Lee et al. ............... 713/165
2006/0046651 A1* 3/2006 Hazell et al. ............ 455/41.2

FOREIGN PATENT DOCUMENTS

| WO | WO 2005/036854 A1 | 4/2005 |
| WO | WO-2005036845 | 4/2005 |

OTHER PUBLICATIONS

Open Mobile Alliance Limited, OMA-TS-BCAST_SvcCntProtection-Interim-Draft-20061218- D.

Martin Bakhuizen and Uwe Horn, Mobile Broadcast/Multicast in Mobile Networks, May 2, 2005, http://www.ericsson.com/ericsson/corpinfo/publications/review/2005_01/012.shtml.

* cited by examiner

METHOD AND APPARATUS FOR CONTENT PROTECTION IN WIRELESS COMMUNICATIONS

CLAIM OF PRIORITY UNDER 35 U.S.C. §119

The present Application for patent claims priority to: Provisional Application No. 60/764,879 entitled "METHOD AND APPARATUS FOR CONTENT PROTECTION IN WIRELESS COMMUNICATIONS" filed Feb. 3, 2006; Provisional Application No. 60/778,742 entitled "METHOD AND APPARATUS FOR CONTENT PROTECTION IN WIRELESS COMMUNICATIONS" filed Mar. 3, 2006; and Provisional Application No. 60/802,556 entitled "METHOD AND APPARATUS FOR CONTENT PROTECTION IN WIRELESS COMMUNICATIONS" filed May 19, 2006. These Provisional Applications are assigned to the assignee hereof and are hereby expressly incorporated by reference herein.

BACKGROUND

1. Field

The present invention relates generally to wireless communications, and more specifically to content protection.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Typical mobile subscribers use a mobile station or terminal such as a mobile phone or a laptop to access the wireless communication system. A mobile station may receive and play or store broadcast or multicast content protected under a digital rights management scheme requiring communication with a rights issuer. However, the mobile station may be outside of the coverage area of the cellular telephone system, preventing play of stored content. There is therefore a need in the art for a mobile station configured to permit play of protected stored content even when outside of a coverage area.

SUMMARY

An aspect of the present invention may reside in a method for securely presenting content in a mobile station. The mobile station may have an air interface for communicating with a content provider and with a remote content rights manager, a user interface for receiving content requests and presenting content, a smart module, and a security agent. The smart module stores content presentation units and has a proxy content rights manager for issuing secure content keys when the mobile station is unable to receive secure content keys from the remote content rights manager using the air interface. The security agent securely receives secure content keys from the remote content rights manager and securely transfers secure content keys between the remote content rights manager and the smart module. In the method, content presentation units are transferred from the remote content rights manager to the smart module, for storage, using the air interface and the security agent. A content presentation request is received while the mobile station is unable to communicate with the remote content manager using the air interface. Secure content keys are requested from the smart module for allowing presentation of the requested content. The secure content keys are transferred, based on one or more of the stored content presentation units, from the proxy content rights manager to the security agent for allowing presentation of the requested content.

In more detailed aspects of the invention, the smart module may be a removable smartcard. The smart module may be a universal subscriber identity module (USIM), a removable user identity module R-UIM, or a cdma2000 subscriber identity module (CSIM). At least one content presentation unit may define an allowed proxy capability of the proxy content rights manager, may be a token indicating a right for presenting secure content, or may be a credit granting a right for presenting secure content.

Additionally, the content provider may be a broadcast content provider and/or a multicast content provider. The method may further include transferring secure content usage information from the proxy content rights manager to the remote content rights manager, and/or to the content provider, when the mobile station is able to communicate with the remote content manager using the air interface. Usage statistics covering each presentation of a content segment and/or program may be maintained. The content segment or program usage statistic may be reported.

In another more detailed aspect of the invention, the secure content keys may be encrypted by the remote content rights manager. The smart module may decrypt the encrypted secure content keys and provide the decrypted secure content keys to the mobile station based on one or more available content presentation units.

Another aspect of the invention may reside in a mobile station including an air interface for communicating with a content provider and with a remote content rights manager, a user interface for receiving content requests and presenting content, a smart module, and a security agent. The smart module stores content presentation units and has a proxy content rights manager for issuing secure content keys when the mobile terminal is unable to receive secure content keys from the remote content rights manager using the air interface. The security agent securely receives secure content keys from the remote content rights manager and securely transfers secure content keys between the remote content rights manager and the smart module. The mobile station further includes means for transferring, using the air interface and the security agent, content presentation units from the remote content rights manager to the smart module for storage, means for requesting secure content keys from the smart module for allowing presentation of the requested content while the mobile station is unable to communicate with the remote content manager using the air interface, and means for transferring secure content keys, based on one or more of the stored content presentation units, from the proxy content rights manager to the security agent for allowing presentation of the requested content.

Yet another aspect of the invention may reside is computer program product comprising computer readable medium comprising code for causing a computer to transfer, using a air interface and a security agent of a mobile station, content presentation units from a remote content rights manager to a smart module of the mobile station for storage, code for causing a computer to request secure content keys from the smart module for allowing presentation of requested content while the mobile station is unable to communicate with the remote content manager using the air interface, and code for causing a computer to securely transfer secure content keys, based on one or more of the stored content presentation units, from the proxy content rights manager to the security agent for allowing presentation of the requested content.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
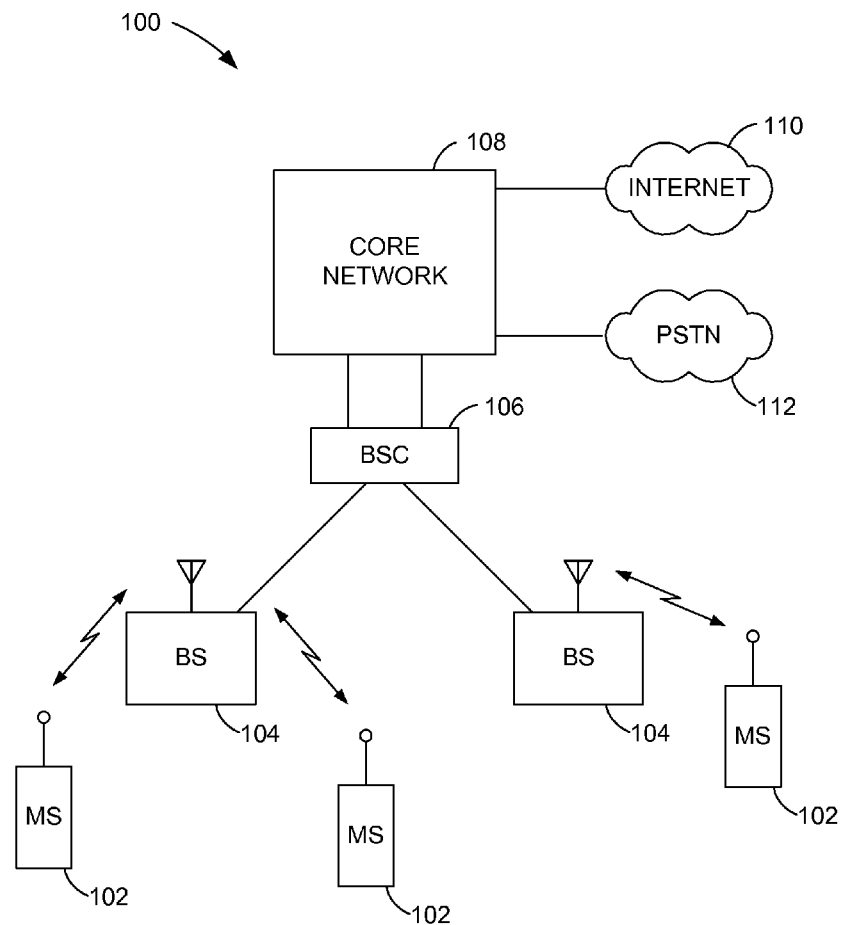
FIG. 1 is an example of a wireless communication system.

With reference to FIG. 1, a wireless communication system 100 includes one or more wireless mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
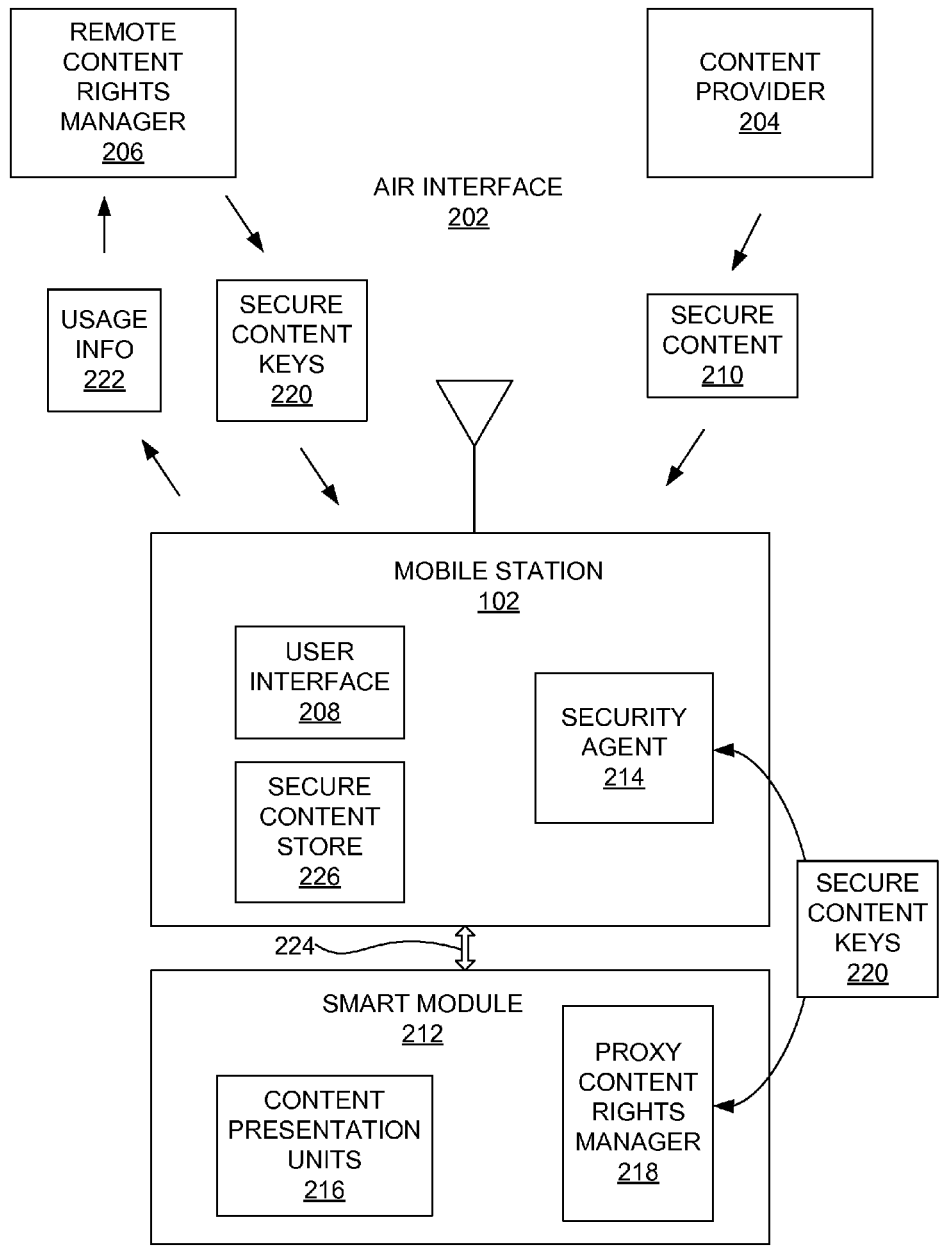
FIG. 2 is a block diagram of a mobile station having a proxy content rights manager, in accordance with an aspect of the invention.
Figure 3:
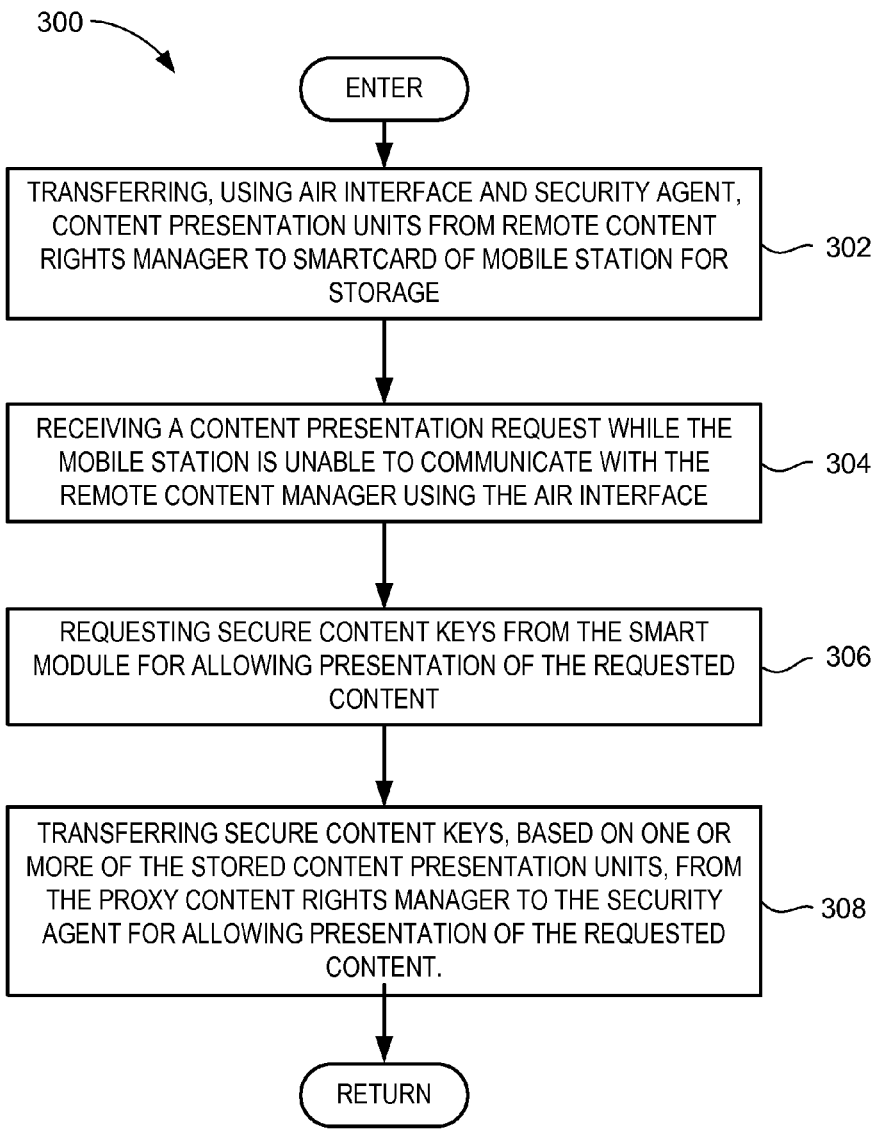
FIG. 3 is a flow diagram of a method for securely presenting content in a mobile station.

With reference to FIGS. 2 and 3, one aspect of the present invention may reside in a method 300 (FIG. 3) for securely presenting content in a mobile station 102 (FIG. 2). The mobile station may have an air interface 202 for communicating with a content provider 204 and with a remote content rights manager 206, a user interface 208 for receiving content requests and presenting content 210, a smart module 212, and a security agent 214. The smart module stores content presentation units 216 and has a proxy content rights manager 208 for issuing secure content keys 220 when the mobile station is unable to receive secure content keys from the remote content rights manager using the air interface. The security agent securely receives secure content keys from the remote content rights manager and securely transfers secure content keys between the remote content rights manager and the smart module. In the method 300, content presentation units are transferred from the remote content rights manager to the smart module, for storage, using the air interface and the security agent (step 302). A content presentation request is received while the mobile station is unable to communicate with the remote content manager using the air interface (step 304). Secure content keys are requested from the smart module for allowing presentation of the requested content (step 306). The secure content keys are transferred, based on one or more of the stored content presentation units, from the proxy content rights manager to the security agent for allowing presentation of the requested content (step 308).

In more detailed aspects of the invention, the content provider 204 may be a broadcast content provider and/or a multicast content provider. The method may further include transferring secure content usage information 222 from the proxy content rights manager 218 to the remote content rights manager 206, and/or to the content provider, when the mobile station 102 is able to communicate with the remote content manager using the air interface 202.

The smart module 212 may be a removable smartcard. The smart module may be a universal subscriber identity module (USIM), a removable user identity module R-UIM, or a cdma2000 subscriber identity module (CSIM). At least one content presentation unit 216 may define an allowed proxy capability of the proxy content rights manager, may be a token indicating a right for presenting secure content, or may be a credit granting a right for presenting secure content.

The technique provides for efficient broadcast and multicast content rights enforcement. The smart module 212 may act as a proxy rights issuer, rights enforcer, and usage reporter. The remote rights manager 206 may load allowed proxy capabilities to the smart module. The smart module may issue a rights object RO to the mobile station 102, and may send the rights objects to the remote rights manager periodically, or when in the coverage of a base station 104 serving the mobile station 102. A secure communication channel 224 may permit secure communications between the smart module and the security agent 214. The secure content 210 may be stored in a secure content store 226 of the mobile station 102.

The remote content rights manager 206 may reside in the core network 108 (FIG. 1), or in a network server available through the internet 110. Likewise, the content provider may reside in the core network 108, or in a network server available through the internet 110.

The remote content rights manager 206 may encrypt the secure content keys 220. The secure content keys 220 may be stored in the encrypted form in the mobile station 102. An encryption key used to protect the secure content keys may be provided to the smart module 212 through secure bootstrapping via the mobile station. When the mobile station plays encrypted content 210, it may present the encrypted secure content keys to the smart module, which decrypts the keys one by one and supplies them to the mobile station, provided that content presentation units 216 are available.

Another aspect of the invention may reside in a mobile station 102 (FIG. 2) including an air interface 202 for communicating with a content provider 204 and with a remote content rights manager 206, a user interface 208 for receiving content requests and presenting content 210, a smart module 212, and a security agent 214. The smart module stores content presentation units 216 and has a proxy content rights manager 218 for issuing secure content keys 220 when the mobile station is unable to receive secure content keys from the remote content rights manager using the air interface. The security agent securely receives secure content keys from the remote content rights manager and securely transfers secure content keys between the remote content rights manager and the smart module. The mobile station further includes means for transferring, using the air interface and the security agent, content presentation units from the remote content rights manager to the smart module for storage, means for requesting secure content keys from the smart module for allowing presentation of the requested content while the mobile station is unable to communicate with the remote content manager using the air interface, and means for transferring secure content keys, based on one or more of the stored content presentation units, from the proxy content rights manager to the security agent for allowing presentation of the requested content.

Yet another aspect of the invention may reside is computer program product comprising computer readable medium comprising code for causing a computer to transfer, using a air interface 202 and a security agent 214 of a mobile station 102, content presentation units 216 from a remote content rights manager 206 to a smart module 212 of the mobile station for storage, code for causing a computer to request secure content keys 220 from the smart module for allowing presentation of requested content 210 while the mobile station is unable to communicate with the remote content manager using the air interface, and code for causing a computer to securely transfer secure content keys, based on one or more of the stored content presentation units, from the proxy content rights manager to the security agent for allowing presentation of the requested content.

One option for BCMCS-based content protection for stored previously streamed content 402 may be described with reference to FIG. 4. A terminal 404 (such as the mobile station 102) asks permission to play the recorded content from a smartcard 406 or module. The smartcard acts as a proxy rights issuer 408 for the terminal. The smartcard sends previously stored traffic encryption keys (TEKs) based on permission in a rights object (RO) 410 received from the smartcard. This may happen even if the terminal is out of the BCMCS coverage area. When network coverage is available, the terminal sends a report 412 of usage statistics to a BCMCS controller 414 or other network server 416.

Figure 4:
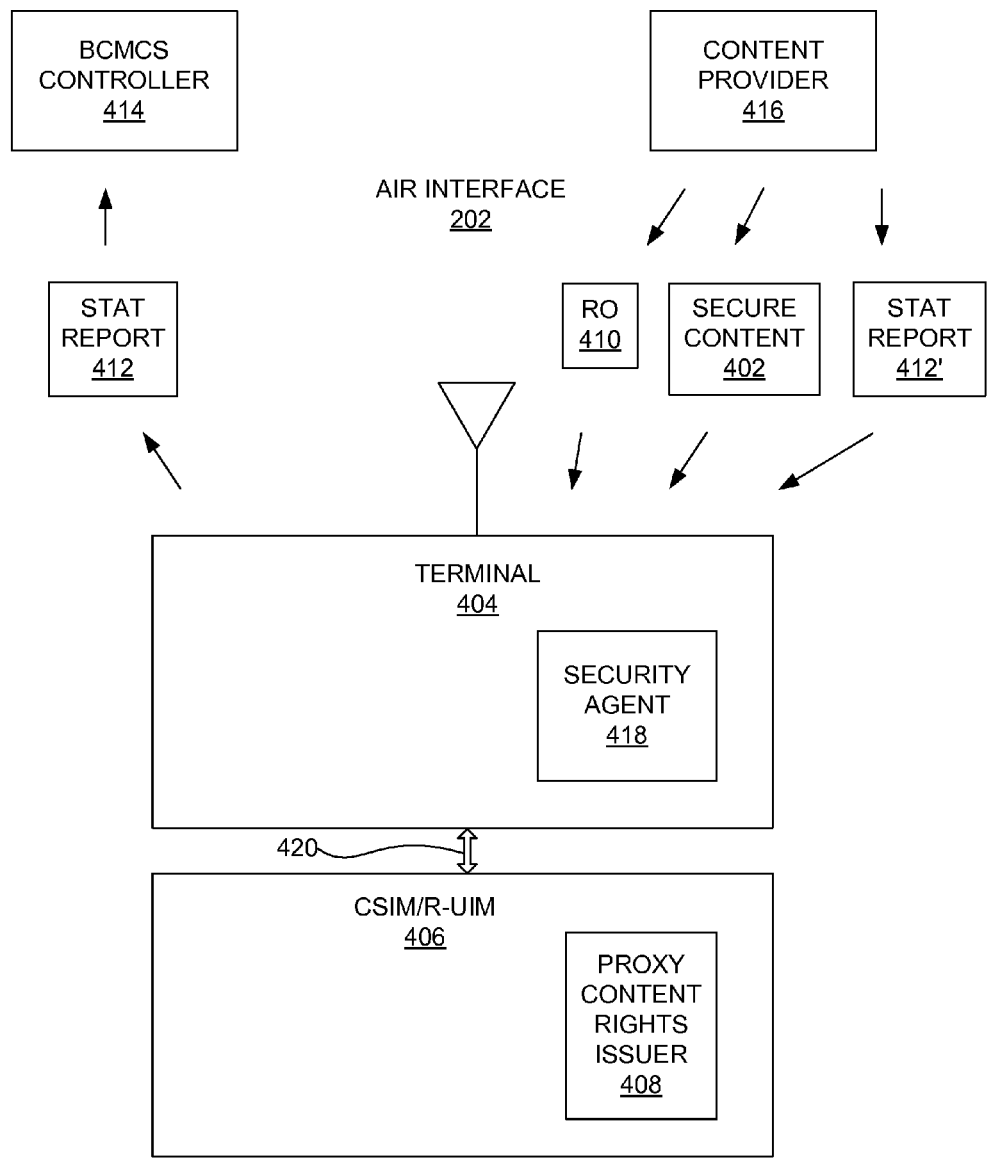
FIG. 4 is a block diagram of a system of BCMCS-based content protection for playing previously streamed content.

Another option for BCMCS-based content protection for stored previously streamed content 402 may be described with respect to FIG. 4. When network coverage is available, the terminal 404 receives ROs from a content provider 416 over a channel that is https (hypertext transport protocol secure) protected. The terminal asks permission to play the recorded content from the smartcard 406. The smartcard acts as a proxy rights issuer 408 for the terminal. The smartcard sends previously stored TEKs based on permission in a RO received from the smartcard. This may happen even if the terminal is out of the BCMCS coverage area. When network coverage is available, the terminal may send a report of usage statistics to the BCMCS controller or other network server. The report may contain detailed statistics such as separate play once and repeat play cases. The service provider may or may not charge for reuse of the stored content. The terminal may send a report 412' of usage statistics to the content provider 416, which may allow the content provider to cross-check usage statistics reported by the service provider.

The usage statistic may include TEK count, time-based accounting, packet-based accounting, or a combination thereof. The terminal 404 may piggyback the report on other signaling messages so that a separate report message may not be required. The usage statistics may be able to distinguish between live streaming content, play of recorded content from beginning to end, and user rewinding of content in the middle of the content. Usage statistics covering each presentation of a content segment and/or program may be maintained. The content segment or program usage statistic may be reported.

The BCMCS controller 414 may send a broadcast access key (BAK) to the smartcard 406 via the mobile terminal 404. A short-term key message (STKM) may be sent from the BCMCS controller to the smartcard 406, or it may be sent by a BCAST service distribution/adaptation (BSDA) unit. The smartcard may send the short-term key (SK) to the security agent 418 on the terminal. The security agent is trusted to discard the SK after use.

Another option for BCMCS-based content protection for stored previously streamed content 402 may be described again with reference to FIG. 4. When network coverage is available, the terminal 404 receives ROs 410 from a content provider 416 over a channel that is https protected. The terminal may be able to store content encryption keys locally. The terminal asks permission to play the recorded content from the smartcard 406. The smartcard acts as a proxy rights issuer 408 for the terminal. In another variation, the smartcard (CSIM or R-UIM) computes and sends content encryption keys to the terminal based on permission in a RO received from the content provider. The encryption keys may be sent over a secure channel 420. This may happen even if the terminal is out of the BCMCS coverage area. When network coverage is available, the terminal sends a report of play once usage statistics to the BCMCS controller or other network server. The service provider may not (or is unable to) charge for multi-play or reuse of the stored content. The terminal may send a report 412' of usage statistics to the content provider, which may allow the content provider to cross-check usage statistics reported by the service provider.

The smartcard-based RO control may be sent via a key message (STKM or long-term key message (LTKM). The RO may indicate rights to play once, record, play multiple times, etc. The technique may be used for both multimedia broadcast multicast service (MBMS) and broadcast and multicast service (BCMCS).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method for securely presenting content in a mobile station having an air interface for communicating with a content provider and with a remote content rights manager, a user interface for receiving content requests and presenting content, a smart module for storing content presentation units and having a proxy content rights manager for issuing secure content keys when the mobile station is unable to receive secure content keys from the remote content rights manager using the air interface, a security agent for securely receiving secure content keys from the remote content rights manager and for securely transferring secure content keys between the remote content rights manager and the smart module, the method comprising:

transferring, using the air interface and the security agent, content presentation units from the remote content rights manager to the smart module for storage;

receiving a content presentation request while the mobile station is unable to communicate with the remote content manager using the air interface;

determining that the mobile station is unable to communicate with the remote content manager using the air interface;

requesting secure content keys from the smart module for allowing presentation of the requested content in response to the determination that the mobile station is unable to communicate with the remote content manager using the air interface; and transferring secure content keys in response to the secure content key request, based on one or more of the stored content presentation units, from the proxy content rights manager to the security agent for allowing presentation of the requested content;

presenting the requested content in response to the transfer of the secure content keys;

maintaining usage statistics associated with the presentation of the requested content;

determining that the mobile station is able to communicate with the remote content manager using the air interface; and transferring the usage statistics, using the air interface, to one or more of the remote content rights manager or the content provider in response to the determination that the mobile station is able to communicate with the remote content manager using the air interface.

2. A method for securely presenting content in a mobile station as defined in claim 1, wherein the smart module is a removable smartcard.

3. A method for securely presenting content in a mobile station as defined in claim 1, wherein the smart module is a universal subscriber identity module (USIM).

4. A method for securely presenting content in a mobile station as defined in claim 1, wherein the smart module is a removable user identity module R-UIM.

5. A method for securely presenting content in a mobile station as defined in claim 1, wherein the smart module is a cdma2000 subscriber identity module (CSIM).

6. A method for securely presenting content in a mobile station as defined in claim 1, wherein at least one content presentation unit defines an allowed proxy capability of the proxy content rights manager.

7. A method for securely presenting content in a mobile station as defined in claim 1, wherein at least one content presentation unit is a token indicating a right for presenting secure content.

8. A method for securely presenting content in a mobile station as defined in claim 1, wherein at least one content presentation unit is a credit granting a right for presenting secure content.

9. A method for securely presenting content in a mobile station as defined in claim 1, wherein transferring the usage statistics comprises transferring, secure content usage information from the proxy content rights manager to the remote content rights manager.

10. A method for securely presenting content in a mobile station as defined in claim 1, wherein transferring the usage statistics comprises transferring, secure content usage information from the proxy content rights manager to the content provider.

11. A method for securely presenting content in a mobile station as defined in claim 1, wherein:

maintaining usage statistics comprises maintaining content segment usage statistics covering each presentation of a content segment; and transferring the usage statistics comprises reporting the content segment usage statistics.

12. A method for securely presenting content in a mobile station as defined in claim 1, wherein:

maintaining usage statistics comprises maintaining program usage statistics covering each presentation of a program; and transferring the usage statistics comprises reporting the program usage statistics.

13. A method for securely presenting content in a mobile station as defined in claim 1, wherein the content provider is a broadcast content provider.

14. A method for securely presenting content in a mobile station as defined in claim 1, wherein the content provider is a multicast content provider.

15. A method for securely presenting content in a mobile station as defined in claim 1, wherein the secure content keys are encrypted by the remote content rights manager, and the smart module decrypts the encrypted secure content keys and provides the decrypted secure content keys to the mobile station based on one or more available content presentation units.

16. A mobile station, comprising:

an air interface for communicating with a content provider and with a remote content rights manager;

a user interface for receiving content requests and presenting content;

a smart module for storing content presentation units, the smart module having a proxy content rights manager for issuing secure content keys when the mobile terminal is unable to receive secure content keys from the remote content rights manager using the air interface;

a security agent for securely receiving secure content keys from the remote content rights manager and for securely transferring secure content keys between the remote content rights manager and the smart module;

means for transferring, using the air interface and the security agent, content presentation units from the remote content rights manager to the smart module for storage;

means for determining that the mobile station is unable to communicate with the remote content manager using the air interface;

means for requesting secure content keys from the smart module for allowing presentation of the requested content in response to the determination that the mobile station is unable to communicate with the remote content manager using the air interface by the means for determining; and means for transferring secure content keys in response to the secure content key request by the means for requesting, based on one or more of the stored content presentation units, from the proxy content rights manager to the security agent for allowing presentation of the requested content;

means for presenting the requested content in response to the transfer of the secure content keys;

means for maintaining usage statistics associated with the presentation of the requested content;

means for determining that the mobile station is able to communicate with the remote content manager using the air interface; and means for transferring the usage statistics, using the air interface, to one or more of the remote content rights manager or the content provider in response to the determination that the mobile station is able to communicate with the remote content manager using the air interface.

17. A mobile station as defined in claim 16, wherein the smart module is a removable smartcard.

18. A mobile station as defined in claim 16, wherein the smart module is a universal subscriber identity module (USIM).

19. A mobile station as defined in claim 16, wherein the smart module is a removable user identity module R-UIM.

20. A mobile station as defined in claim 16, wherein the smart module is a cdma2000 subscriber identity module (CSIM).

21. A mobile station as defined in claim 16, wherein at least one content presentation unit defines an allowed proxy capability of the proxy content rights manager.

22. A mobile station as defined in claim 16, wherein at least one content presentation unit is a token indicating a right for presenting secure content.

23. A mobile station as defined in claim 16, wherein at least one content presentation unit is a credit granting a right for presenting secure content.

24. A mobile station as defined in claim 16, wherein means for transferring the usage statistics comprises means for transferring secure content usage information from the proxy content rights manager to the remote content rights manager.

25. A mobile station as defined in claim 16, wherein means mans for transferring the usage statistics comprises means for transferring secure content usage information from the proxy content rights manager to the content provider.

26. A mobile station as defined in claim 16, wherein:
means for maintaining usage statistics comprises means for maintaining content segment usage statistics covering each presentation of a content segment; and
means for transferring the usage statistics comprises means for reporting the content segment usage statistics.

27. A mobile station as defined in claim 16, wherein:
means for maintaining usage statistics comprises means for maintaining program usage statistics covering each presentation of a program; and
means for transferring the usage statistics comprises means for reporting the program usage statistics.

28. A mobile station as defined in claim 16, wherein the content provider is a broadcast content provider.

29. A mobile station as defined in claim 16, wherein the content provider is a multicast content provider.

30. A mobile station as defined in claim 16, wherein:
the secure content keys are encrypted by the remote content rights manager; and
the smart module includes means for decrypting the encrypted secure content keys and providing the decrypted secure content keys to the mobile station based on one or more available content presentation units.

31. A non-transitory computer readable medium comprising:
code for causing a computer to transfer, using an a air interface and a security agent of a mobile station, content presentation units from a remote content rights manager to a smart module of the mobile station for storage;
code for causing a computer to receive a content presentation request while the mobile station is unable to communicate with the remote content manager using the air interface;
code for causing a computer to determine that the mobile station is unable to communicate with the remote content manager using the air interface;
code for causing a computer to request secure content keys from the smart module for allowing presentation of requested content in response to the determination that the mobile station is unable to communicate with the remote content manager using the air interface; and
code for causing a computer to securely transfer secure content keys in response to the secure content key request, based on one or more of the stored content presentation units, from the proxy content rights manager to the security agent for allowing presentation of the requested content;
code for presenting the requested content in response to the transfer of the secure content keys;
code for maintaining usage statistics associated with the presentation of the requested content;
code for determining that the mobile station is able to communicate with the remote content manager using the air interface; and
code for transferring the usage statistics, using the air interface, to one or more of the remote content rights manager or the content provider in response to the determination that the mobile station is able to communicate with the remote content manager using the air interface.

* * * * *